P. BEGHETTI

WIRE TWISTING DEVICE

April 8, 1930.

Original Filed Feb. 29, 1928

Re. 17,636

Inventor

Peter Beghetti.

By Miller & Boykew

Attorney

Reissued Apr. 8, 1930

Re. 17,636

UNITED STATES PATENT OFFICE

PETER BEGHETTI, OF SAN FRANCISCO, CALIFORNIA

WIRE-TWISTING DEVICE

Original No. 1,698,689, dated January 8, 1929, Serial No. 257,849, filed February 29, 1928. Application for reissue filed November 13, 1929. Serial No. 406,968.

This invention relates to wire tightening and twisting devices as used by the builders of wooden forms for casting concrete walls and the like, and particularly to the type of such a device disclosed in my copending application filed under Serial No. 201,787 on June 27, 1927, entitled "Wire pulling and twisting tool".

The objects of the invention are to provide a device of the character mentioned which will be easier to operate and which will more effectively clamp the wires to be pulled and twisted.

In the drawings accompanying this specification Fig. 1 is a perspective view of one form of my improved wire twisting device with wire receiving jaws open.

As with my previous disclosure in the copending application referred to my device consists of a carpenter's brace-like implement, but instead of a bit chuck at the forward end it is provided with means for holding a pair of wire strands so that the wires may be twisted together upon turning the brace, and the tool is provided with a forwardly projecting nose or heel so arranged that it may be placed against the studding or side of the wall form and used as a fulcrum for pulling the wires, before and at intervals while twisting the same.

The improvements herein consist principally of the provision of a pair of jaws for gripping the wire ends and a handle for operating the jaws, by means of which any desired grip may be placed upon the wires and the handle locked in place.

Figure 1:
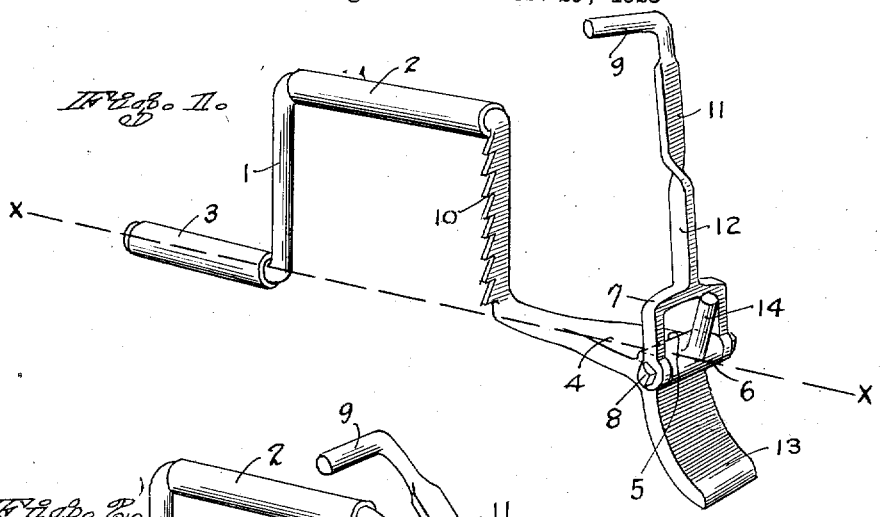
Figure 2:
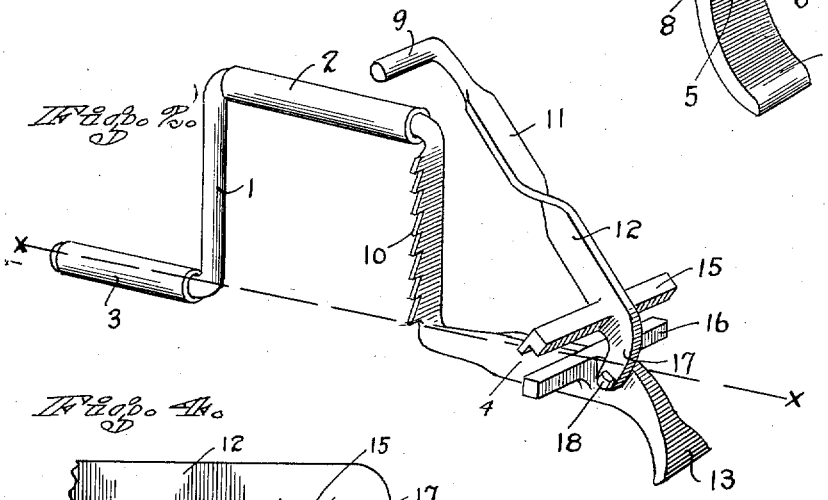
Fig. 2 is a perspective view of another form of my improved wire twisting device with wire receiving jaws open.

In the drawings, both Figs. 1 and 2, the carpenter's brace portion is shown at 1 provided with revolvable sleeves at 2 and 3 for grasping in the hands to operate like any common carpenter's brace.

Figure 3:
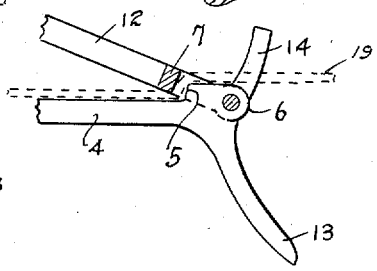
Fig. 3 is a side view of the forward end of the device of Fig. 1 with the near side wall of the upper jaw broken away, and with the jaws closed upon a wire dotted in place.

In Figs. 1 and 3 the forward end of the brace is formed into a shank 4 provided with a step or jaw 5 and a socket 6 to which a yoke-like jaw 7 is pivoted by means of a bolt 8.

This jaw 7 is arranged to swing down over the jaw 5 as shown in Fig. 3 and to clamp a wire, or pair of wires to be twisted. The position of the wire when clamped is indicated in the dotted lines 19 and it will be seen that the wire is kinked substantially at right angles in two places where it is gripped between jaws 5 and 7.

A handle 9 extends from the pivoted jaw 7 so that the jaw may be clamped upon or released from the wires, and the handle engages any of a series of ratchet teeth 10 formed on the brace to hold the jaws in clamped position.

The handle is preferably provided with a flattened portion at 11 adapted to engage the ratchet teeth, and is made of spring metal flattened at 12 so arranged as to yieldingly hold the portion 11 against the ratchet teeth.

Projecting forwardly and outwardly from the forward end 6 of the tool is the fulcrum nose 13, while projecting upwardly from end 6 is a horn 14 which functions as a separator for two strands of wire held in the tool for twisting.

Figure 4:
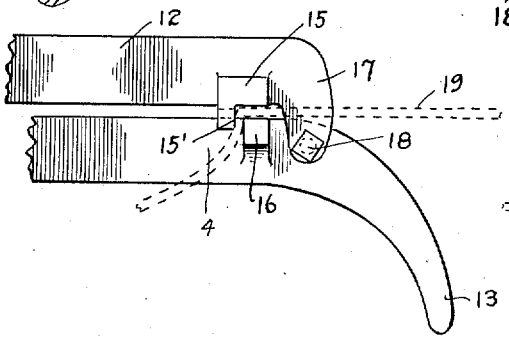
Fig. 4 is a side view of the forward end of the device of Fig. 2 with the jaws closed upon a wire dotted in place.

In Figs. 2 and 4 all parts from 1 to 4, and 9 to 13 described for Figs. 1 and 3 are duplicated here and function the same as for Figs. 1 and 3, hence bear the same numerals.

The difference in the construction of Figs. 2 and 4 is that the upper jaw 15 is not of yoke form, but has its ends projecting freely at opposite sides of the upper jaw handle, and the lower jaw 16 is similarly formed so that when the jaws are open as shown in Fig. 2 the wires to be twisted together may be freely slipped in place from opposite sides instead of being poked longitudinally into place from in front of the tool.

In Figs. 2 and 4 the wires are kept separated by the lower end 17 of the handle which is pivoted to the shank of the brace by a bolt 18.

The wire pulling fulcrum 13 shown in Fig.

2 is reversely curved from that shown in Fig. 1 but functions the same as it provides a fulcrum for the device forwardly of the wire clamping jaws and outwardly from the main axis X—X of the brace.

In Fig. 4 the closed position of the jaws is shown with wire or wires 19 dotted in place and kinked by means of a rear lip 15′ on the upper jaw coming down in back of the lower jaw 16.

While I show the preferred form of my tool provided with a carpenter's brace portion it is evident that the peculiar construction of the jaw arrangement of this tool has especial value for concrete form workers as a simple hand tool as shown in Figs. 3 and 4 with suitable lengths of handles without the brace portion, especially when working in corners where the brace would interfere with twisting of the wires by revolving the tool.

Having thus described my improved wire twisting device, I claim:

1. A mechanic's tool comprising a carpenter's brace frame with a shank at the forward end thereof, a wire clamping jaw operatively mounted on said shank, an operating handle extending from said jaw, and ratchet means on said brace frame adapted to engage said handle to hold said jaw in clamped position, and clamping means on said shank cooperating with said jaw adapted to kink said wire in clamping the same.

2. A mechanic's tool comprising a carpenter's brace frame with a shank at the forward end thereof, a wire clamping jaw operatively mounted on said shank, an operating handle extending from said jaw, and means on said brace frame adapted to engage said handle to hold said jaw in clamped position and means on the forward end of said tool arranged and a dapted to space a pair of wires clamped by said jaw.

3. A mechanic's tool comprising a carpenter's brace frame with a shank at the forward end thereof, a pair of wire clamping jaws on the forward end of said shank, one of said jaws pivotally mounted on the shank so as to open and close with respect to the other, a hand lever extending rearwardly from the pivoted jaw for operating the same, and means on the brace frame portion arranged and adapted to hold the handle locked at various points of adjustment with jaws in closed position.

4. A mechanic's tool comprising a carpenter's brace frame with a shank at the forward end thereof, a pair of wire clamping jaws on the forward end of said shank, one of said jaws pivotally mounted on the shank so as to open and close with respect to the other, means for locking the jaws together, and one of said jaws extending forwardly and outwardly beyond the other of said jaws.

5. A mechanic's tool comprising a carpenter's brace frame with a shank at the forward end thereof, a pair of wire clamping jaws on the forward end of said shank, one of said jaws pivotally mounted on the shank so as to open and close with respect to the other, said jaws arranged in offset relation so as to put a kink in a wire gripped thereby.

6. A mechanic's tool comprising a pair of levers pivoted together adjacent one end, a jaw on each lever adjacent the pivotal point of the levers extending transversely of the levers arranged in offset relation to kink a wire clamped between said jaws through operation of the levers.

7. A mechanic's tool comprising a pair of levers pivoted together at their forward ends, a pair of wire clamping jaws extending transversely of the levers on opposite sides thereof in back of their pivotal point whereby wires extending into transversely of the jaws and on opposite sides of the levers will be held spaced at a point just forward of the jaws.

8. A mechanic's tool comprising a pair of levers pivoted together at their forward ends, a pair of wire clamping jaws extending transversely of the levers in back of their pivotal point in stepped relation to one another whereby wires extending between the jaws will be kinked when gripped therebetween.

9. A mechanic's tool comprising a pair of levers pivoted together at one end a pair of wire clamping jaws extending transversely of the levers adjacent the pivotal point and a portion of one of the levers extending in front of the jaws whereby a pair of wires gripped in the jaws are spaced apart at the forward sides of the jaws.

In testimony whereof I have hereunto set my hand this 9th day of November, 1929.

PETER BEGHETTI.